United States Patent
Donolo et al.

(10) Patent No.: US 11,469,588 B2
(45) Date of Patent: Oct. 11, 2022

(54) ELECTRIC POWER SYSTEM DIFFERENTIAL PROTECTION WITH DC COMPENSATION

(71) Applicant: Schweitzer Engineering Laboratories, Inc., Pullman, WA (US)

(72) Inventors: Marcos A. Donolo, Pullman, WA (US); Andrea Di Tomasso, Milan (IT); Yusuf Zafer Korkmaz, Berkshire (GB); Jay Hartshorn, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/411,335

(22) Filed: Aug. 25, 2021

(65) Prior Publication Data
US 2022/0069566 A1    Mar. 3, 2022

Related U.S. Application Data

(60) Provisional application No. 63/072,475, filed on Aug. 31, 2020.

(51) Int. Cl.
*H02H 7/20* (2006.01)
*H02H 1/00* (2006.01)

(52) U.S. Cl.
CPC ............ *H02H 7/20* (2013.01); *H02H 1/0007* (2013.01)

(58) Field of Classification Search
CPC ......... H02H 7/20; H02H 1/0007; H02H 3/283
See application file for complete search history.

(56) References Cited

U.S. PATENT DOCUMENTS

| | | |
|---|---|---|
| 5,805,394 A | 9/1998 | Glennon |
| 6,341,055 B1 | 1/2002 | Guzman-Casillas |
| 6,356,421 B1 | 3/2002 | Guzman-Casillas |
| 6,518,767 B1 | 2/2003 | Roberts |
| 6,590,397 B2 | 7/2003 | Roberts |
| 7,196,884 B2 | 3/2007 | Guzman-Casillas |
| 7,319,576 B2 | 1/2008 | Thompson |
| 7,345,863 B2 | 3/2008 | Fischer |

(Continued)

OTHER PUBLICATIONS

Schweitzer Engineering Laboratories, Inc., SEL-300G Multifunction Generator Relay, Instruction Manual (excerpts) Oct. 17, 2014.

(Continued)

*Primary Examiner* — Jared Fureman
*Assistant Examiner* — Nicolas Bellido
(74) *Attorney, Agent, or Firm* — Richard M. Edge

(57) ABSTRACT

Differential protection of electric power delivery system equipment using a compensated operating signal under spurious conditions is disclosed herein. Current transformers (CTs) may provide spurious current signals under certain operating conditions resulting in unintended operation of differential protection. The present disclosure uses a compensated operating signal during such conditions. The compensated operating signal is calculated using operate current and a difference between direct current content of currents obtained from the CTs. Switching between use of the operate current and the compensated operating signal is based on a comparison of the average direct current content of the CTs and a threshold.

20 Claims, 11 Drawing Sheets

(56) References Cited

U.S. PATENT DOCUMENTS

| | | | |
|---|---|---|---|
| 7,375,941 B2 | 5/2008 | Schweitzer | |
| 7,425,778 B2 | 9/2008 | Labuschagne | |
| 7,660,088 B2 | 2/2010 | Mooney | |
| 7,903,381 B2 | 3/2011 | Fischer | |
| 8,154,836 B2 | 4/2012 | Kasztenny | |
| 8,194,374 B2 | 6/2012 | Guzman-Casillas | |
| 8,289,668 B2 | 10/2012 | Kasztenny | |
| 8,405,940 B2 | 3/2013 | Schweitzer | |
| 8,405,944 B2 | 3/2013 | Donolo | |
| 8,553,379 B2 | 10/2013 | Kasztenny | |
| 8,559,146 B2 | 10/2013 | Kasztenny | |
| 8,649,142 B2 * | 2/2014 | Kasztenny | H02H 3/28 361/87 |
| 8,792,217 B2 | 7/2014 | Shah | |
| 9,660,438 B2 * | 5/2017 | Donolo | H02H 7/06 |
| 10,530,146 B2 * | 1/2020 | Mieske | H02H 7/065 |
| 2007/0070565 A1 | 3/2007 | Benmouyal | |
| 2009/0009181 A1 * | 1/2009 | Gangadharan | H02H 3/286 324/522 |
| 2009/0228224 A1 | 9/2009 | Spanier | |
| 2010/0002348 A1 | 1/2010 | Donolo | |
| 2010/0264749 A1 | 10/2010 | Guzman-Casillas | |
| 2011/0063761 A1 | 3/2011 | Kasztenny | |
| 2011/0063766 A1 | 3/2011 | Kasztenny | |
| 2011/0264389 A1 | 10/2011 | Mynam | |
| 2012/0140365 A1 | 6/2012 | Labuschagne | |
| 2014/0002937 A1 | 1/2014 | Tausa | |
| 2014/0100702 A1 | 4/2014 | Schweitzer | |
| 2014/0117912 A1 | 5/2014 | Gajic | |
| 2016/0006240 A1 * | 1/2016 | Li | H02H 3/283 361/93.1 |
| 2016/0149390 A1 | 5/2016 | Donolo | |

OTHER PUBLICATIONS

Thompson, Michael J.; Percentage Restrained Differential, Percentage of What?; Sep. 14, 2010.

Altuve, Hector; Schweitzer III, Edmund; Modern Solutions for Protection, Control, and Monitoring of Electric Power Systems (sections of); Jun. 10, 2010.

Faridul Katha Basha, Michael Thompson, "Practical EHV Reactor Protection", Originally presented at the 66th Annual Conference for Protective Relay Engineers, Apr. 2013.

Marcos Donolo, Armando Guzmán, Mangapathirao V. Mynam, Rishabh Jain, Dale Finney, "Generator Protection Overcomes Current Transformer Limitations", Originally presented at the 41st Annual Western Protective Relay Conference, Oct. 2014.

Austin Wade, Jordan Bell, Marcos Donolo "CT Saturation on Transformer Energization: Ensuring Your Black-Start Generator Stays Online", Presented at the 46th Annual Western Protective Relay Conference, Oct. 2019.

\* cited by examiner

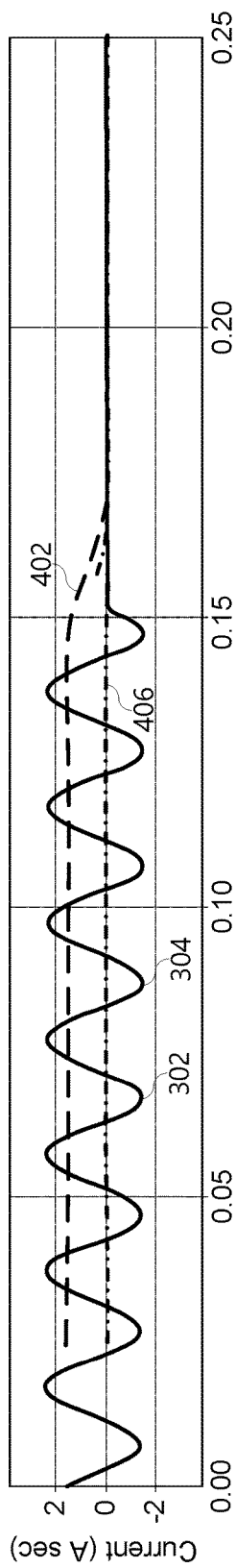
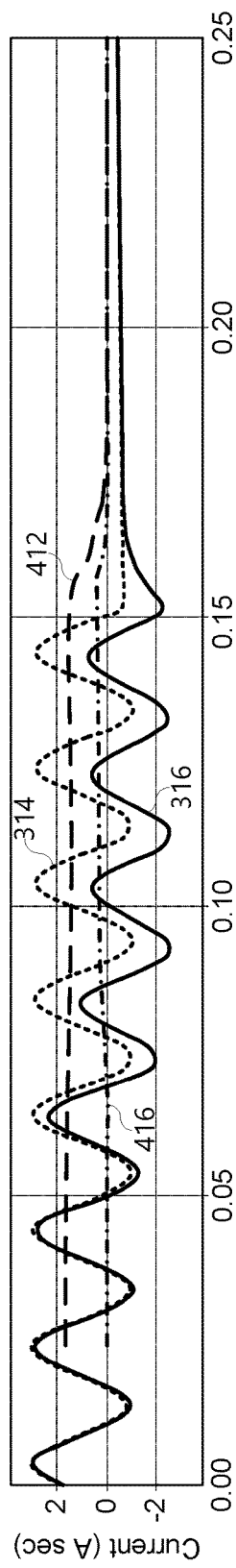
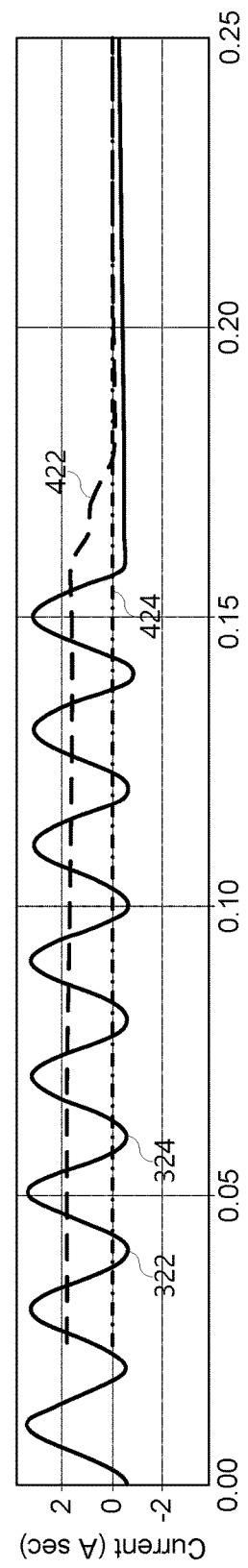
Figure 4A
Figure 4B
Figure 4C

ELECTRIC POWER SYSTEM DIFFERENTIAL PROTECTION WITH DC COMPENSATION

RELATED APPLICATIONS

This application claims priority from and benefit of U.S. Provisional application Ser. No. 63/072,475, filed on 31 Aug. 2020 entitled "Electric Power System Differential Protection with DC Compensation" which is hereby incorporated by reference in its entirety for all purposes.

TECHNICAL FIELD

This disclosure relates to differential protection for electric power system equipment with direct current ("DC") compensation. More particularly, this disclosure relates to differential protection of a shunt reactor using operate and restraint signals compensated for DC.

BRIEF DESCRIPTION OF THE DRAWINGS

Non-limiting and non-exhaustive embodiments of the disclosure are described, including various embodiments of the disclosure with reference to the figures, in which:

FIGS. 4A, 4B, and 4C illustrate current diagrams over time for an undesired operation along with operate and restraint currents.

Figure 1:
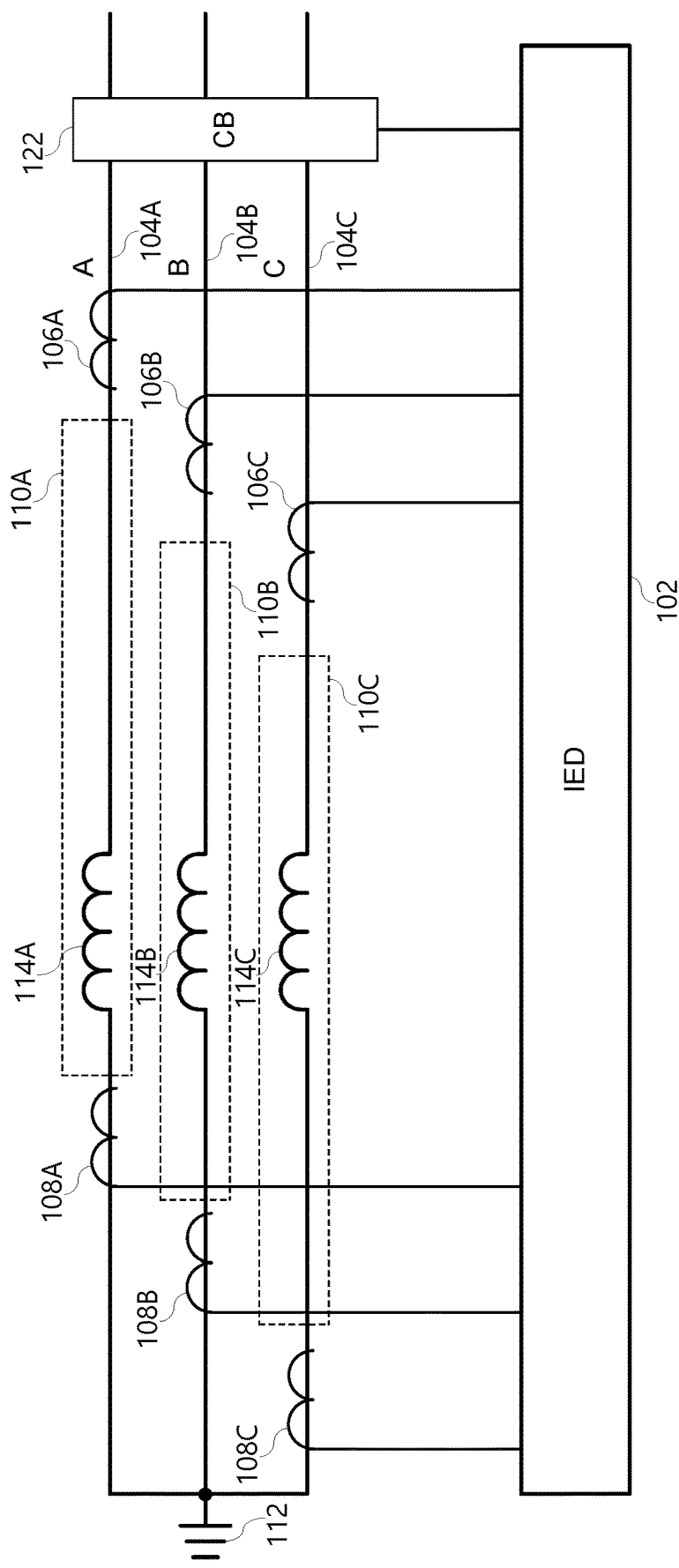
FIG. 1 illustrates a block diagram of current connections of a protective relay with protected zones of a differential element protecting a shunt reactor

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Electric power delivery systems use various equipment for the safe and reliable generation, transmission, and distribution of electric power. Such activities require monitoring and regulation of not only active power, but also reactive power (i.e. volt-ampere reactive or VAR). Often, generators working as synchronous condensers may be sufficient to balance the reactive power. However, as inverter-based generation is added to the generation mix, alternative methods have been introduced to balance reactive power. For example, power delivery systems may use VAR compensators, shunt reactors, or the like to balance reactive power. Shunt reactors may be selectively added and removed by simply closing or opening switches to connect the shunt reactor from a portion of the electric power delivery system.

Shunt reactors and various other power system equipment may be monitored, protected, and controlled using intelligent electronic devices (IEDs). IEDs obtain signals from the monitored equipment or monitored system (such as current, voltage, equipment status, and the like) and determine operational states of the equipment or system using the signals. IEDs may use the operational state to determine whether a protective action or control action should be taken, and execute such a protective or control action. In the case of shunt reactors, an IED may be used to determine an overcurrent condition, ground fault condition or the like. When such a condition is determined to exist, the IED may execute a protective action such as sending a trip command to a circuit breaker to open and remove electric power from the shunt reactor. Similar protective functions may be applied to various other electric power delivery system equipment.

Electric power system signals are typically provided to the IED using instrument transformers such as current transformers (CTs), potential transformers (PTs), and the like. CTs are susceptible to errors due to saturation. Furthermore, when CTs on either end of the protected equipment react differently for the same through current, differential protection may be compromised.

What is needed is a system for differential protection capable of overcoming shortcomings with instrument transformers providing electrical signals. In particular, what is needed is a system for providing secure differential protection even when CTs on either side of the protected equipment react differently for the same through current.

Presented herein are systems and methods for differential protection even when CTs on either side of the protected equipment react differently for the same through current. Systems and methods described herein generally determine direct current (DC) content on either side of the protected equipment such as DC content on the terminal side and DC content on the ground side. When a calculated DC content remains above a threshold for a predetermined time, then a compensated operate current is used for differential protection. The systems and methods herein may be used to avoid unintended operations in differential protection.

The phrases "coupled to," "connected to," and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term intelligent electronic device (IED) may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs. The frequency tracking devices and systems described herein may be a component of an IED or in communication with a separate IED.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once, unless otherwise specified.

FIG. 1 illustrates a simplified block diagram of a portion of an electric power delivery system that is monitored and protected using an IED 102. The electric power delivery system may be a three-phase system with the separate phases being carried on conductors 104A, 104B, and 104C. The illustrated example includes a shunt reactor with coils 114A, 114B, and 114C. An IED 102 may be configured with protected zones 110A, 110B, and 110C covering the reactor coils. The IED 102 obtains current signals on the ground 112 side (or low side) of the shunt reactor using CTs 108A, 108B, and 108C. The IED 102 also obtains current signals on the terminal side (or high side) of the shunt reactor using CTs 106A, 106B, and 106C. The IED 102 may signal a circuit breaker (CB) 122 to trip the shunt reactor open, and may obtain a status signal (open or closed) from the CB 122. In various embodiments, the IED 102 may signal the CB 122 to close to connect the shunt reactor to the broader electric power delivery system. The CB 122 may be capable of separately tripping and/or closing each phase, or may be configured to trip and-or close all three phases together.

As has been introduced above, the IED 102 may provide various protection and monitoring operations. For example, the IED 102 may monitor the current on the ground 112 side of the protected equipment using signals from CTs 108A, 108B, and 108C. IED 102 may determine an overcurrent condition using current signals from CTs 106A, 106B, and 106C and signal CB 122 to trip when an overcurrent condition is detected. Several additional monitoring and protection operations may be performed by IED 102 using current signals, voltage signals (using PTs, not illustrated), equipment status, and the like.

The IED 102 may also be configured to provide differential protection to the shunt reactor. Differential protection operates on the sum of currents entering the protected zone. This sum, called differential or operate current, is proportional to the fault current for internal faults and approaches zero for any other operating condition. Many differential elements operate on a per-phase magnitude of the vector sum of the currents entering a protected zone called operate current (Equation 1). To provide sensitive yet secure protection, the differential element uses a restraint current as the magnitude sum of the currents (Equation 2).

$$I_{OP} = |I_{High} + I_{Low}| \qquad \text{Eq. 1}$$

$$I_{RT} = |I_{High}| + |I_{Low}| \qquad \text{Eq. 2}$$

where:
$I_{OP}$ is the operate current;
$I_{RT}$ is the restraint current;
$I_{High}$ is the current on one side of the protected equipment such as the terminal side; and
$I_{Low}$ is the current on the other side of the protected equipment such as the ground side.

Figure 2:
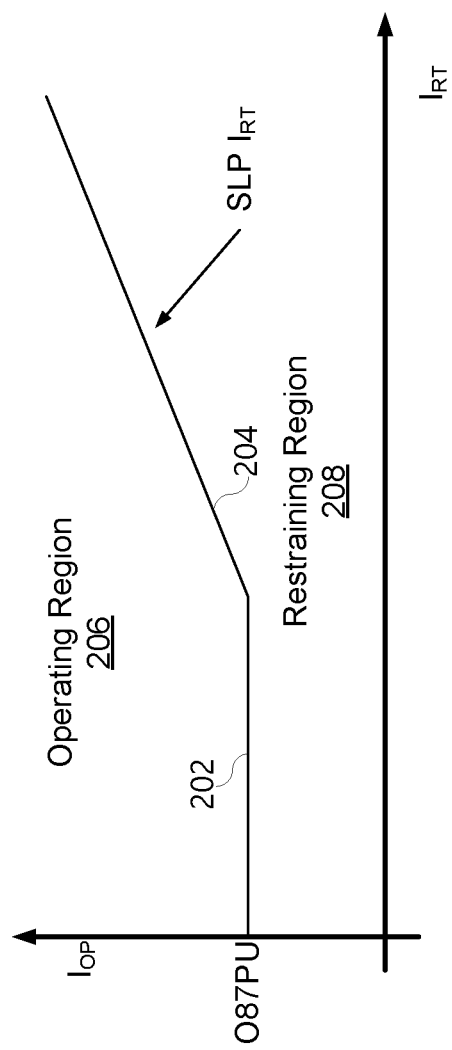
FIG. 2 illustrates a differential element operating characteristic.

The restraint current $I_{RT}$ provides security for when the CTs making up the differential protection zone respond differently. Causes for these differences include magnetizing current, relay measurement errors, CT ratio errors, and CT mismatch errors. The differential protection element of IED 102 may be a percentage differential element where the operate current $I_{OP}$ must exceed a function of the restraint current $I_{RT}$. For example, the differential protection element may assert (determine a fault condition and signal a trip protection action) when the operate current $I_{OP}$ exceeds a minimum pickup threshold and exceeds a percentage of the restraint current $I_{RT}$ as shown in Equation 3:

$$I_{OP} \geq DPU$$

and $$I_{OP} \geq SLP * I_{RT} \qquad \text{Eq. 3}$$

where:
DPU is a predetermined differential element pickup threshold; and
SLP is a predetermined differential element slope FIG. 2 illustrates a plot of a differential operating characteristic in accordance with several embodiments herein. The differential operating characteristic includes an operate current $I_{OP}$ axis and a restraint current $I_{RT}$ axis. An operate region 206 and restraining region 208 are separated by the differential element pickup threshold DPU 202 and the characteristic of the product of the slope and restraint current $I_{RT}$ 204. When a given operating point, which may be defined as a pair of operate current $I_{OP}$ and restraint current $I_{RT}$ at a time, is in the operating region 206, then the system may determine a fault condition and take a protective action. When the operating point is in the restraining region 208, then a fault condition is not detected and no protective action should be taken. In various systems, the operating point must remain in the operating region 206 for a predetermined time before a differential fault is detected and a protective action is to be taken.

Various factors may lead to spurious signals from the CTs on either side of protected equipment. For example, CTs on one side may have different magnetic characteristics, and/or different secondary winding and wiring impedances than the CTs on the other side of the protected equipment. CTs on one side of the equipment may have been provided by the equipment manufacturer, whereas the CTs on the other side may have been selected and installed by the equipment owner, and may have different specifications including how they react to primary current. Another factor is different reactions to inrush current. Although steps may be taken to limit inrush current when a piece of equipment is switched into an electrical power system, there are conditions under which inrush current may occur. For example, some equipment is configured to connect to the electrical power system only during a voltage zero-crossing using a point-on-wave device. As switching characteristics change (due to aging and/or changes in the ambient conditions), the point-on-wave device is less capable to affect a zero-crossing close. This results in inrush current during the switching operation, and an increase of flux inside the CT. The increase of flux may result in asymmetric saturation of the CTs used for differential protection.

These spurious signals from the CTs are used by the differential protection element to calculate operate and restraint currents that are not accurately representative of the actual electrical condition of the monitored equipment. Accordingly, an operating point may be incorrectly calculated to be in the operating region, and may lead to an unintended operation such as a protection action when such action is not needed.

FIGS. 3A, 3B, 3C, 4A, 4B, 4C, and 5 illustrate an example of such spurious signals that may result in an unintended operation. In the illustrated example, a shunt reactor is protected using an IED obtaining electrical signals from CTs on the low and high (ground and terminal) sides of the shunt reactor, and operating a differential element.

Figure 3A:
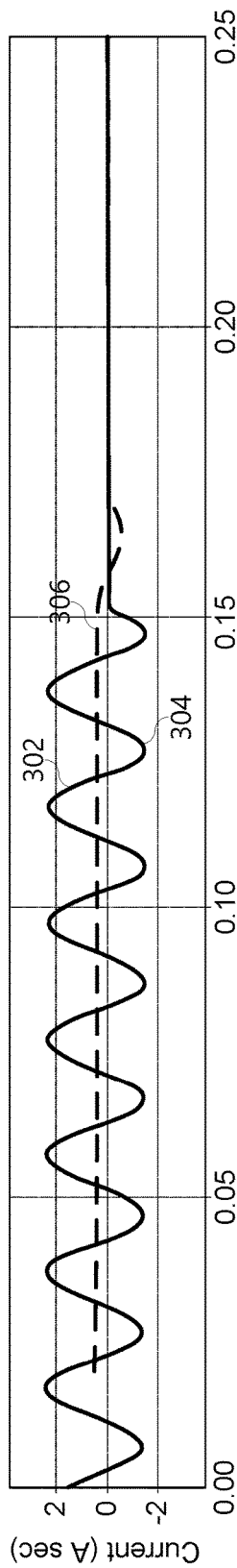
FIGS. 3A, 3B and 3C illustrate current and DC content of current over time for an undesired operation due to differential currents on phase B.
Figure 3B:
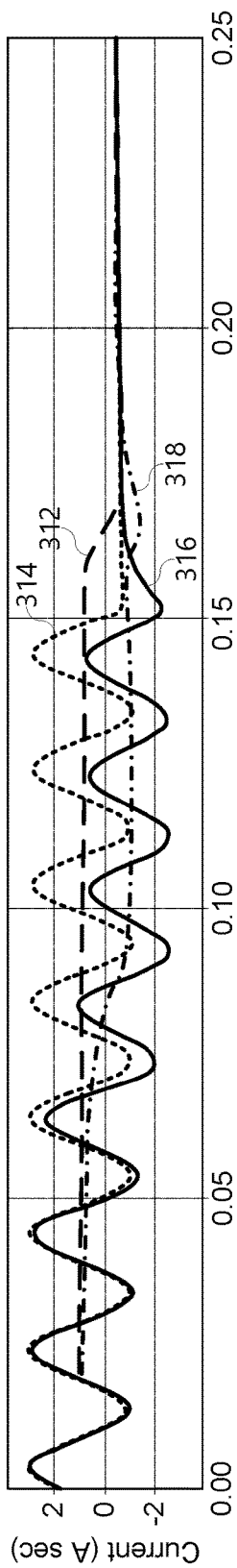
Figure 3C:
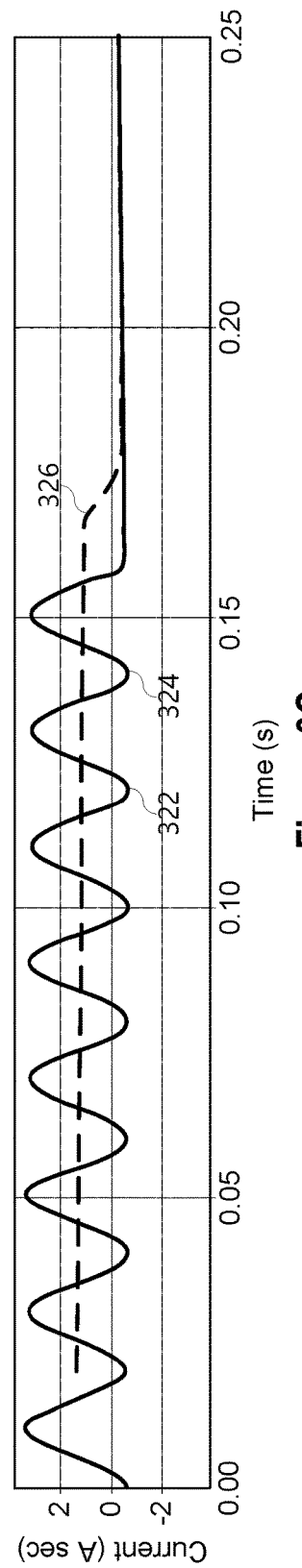

FIGS. 3A, 3B, and 3C illustrate unfiltered currents. In particular, the A-phase low-side current 302 and A-phase high-side current 304 are nearly identical. The DC content 306 of the A-phase currents is also illustrated. Similarly, the B-phase high-side 314 and low-side 316 signals and corresponding B-phase high-side DC content 312 and B-phase low-side DC content 318 are illustrated. Finally, the C-phase low-side current 322 and C-phase high-side current 324 can be seen as nearly identical. The DC content 326 of the C-phase currents is also illustrated. Clearly illustrated is a large, slowly decaying DC component in the unfiltered currents on the B-phase.

FIGS. 4A, 4B, and 4C illustrate the A-, B-, and C-phase current signals with the calculated operate and restraint currents also imposed. That is, the A-phase operate current 406, A-phase restraint current 402, B-phase operate current 416, B-phase restraint current 412, C-phase operate current 424 and C-phase restraint current 422 are illustrated. Both the A-phase and C-phase operate current remain close to zero, whereas the B-phase operate current can be seen as non-zero for a period of time. A spurious differential condition was detected at around time 0.10.

Figure 5:
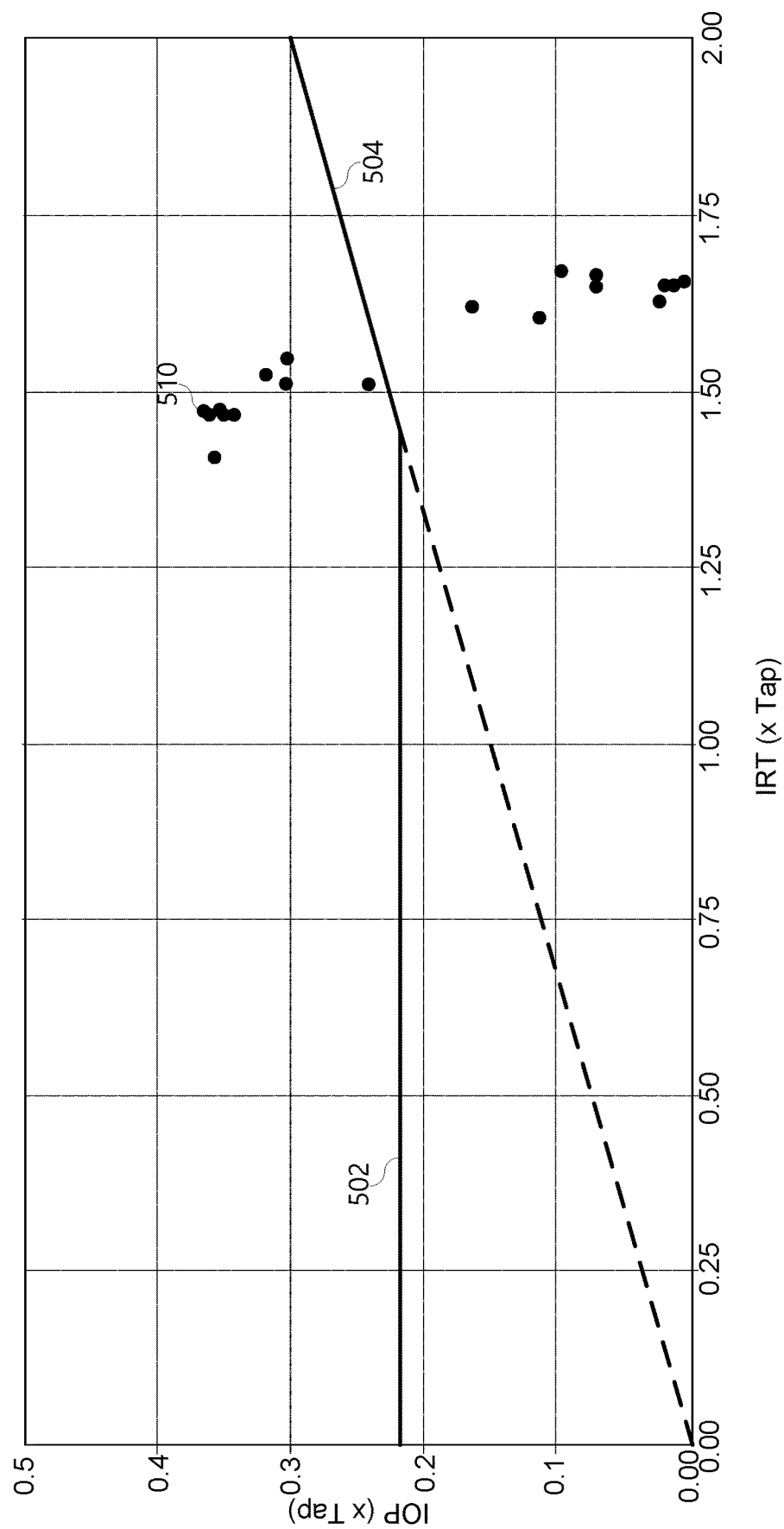
FIG. 5 illustrates a diagram of the differential element operating characteristic with the operate current for the undesired operation.

FIG. 5 maps the operate current and restraint current onto the operating characteristic of the differential element for the currents in FIGS. 3A-3C and 4A-4C. It can be seen that several operating points 510 are in the operating region above the differential element pickup threshold 502 and the differential element slope 504. Thus, the element determined that a fault condition was present, and a protection action was executed, resulting in an unintended operation. As is discussed herein, the present embodiments may more accurately determine a differential fault condition even when CTs provide certain spurious signals or react differently to current in the protected equipment.

Figure 6:
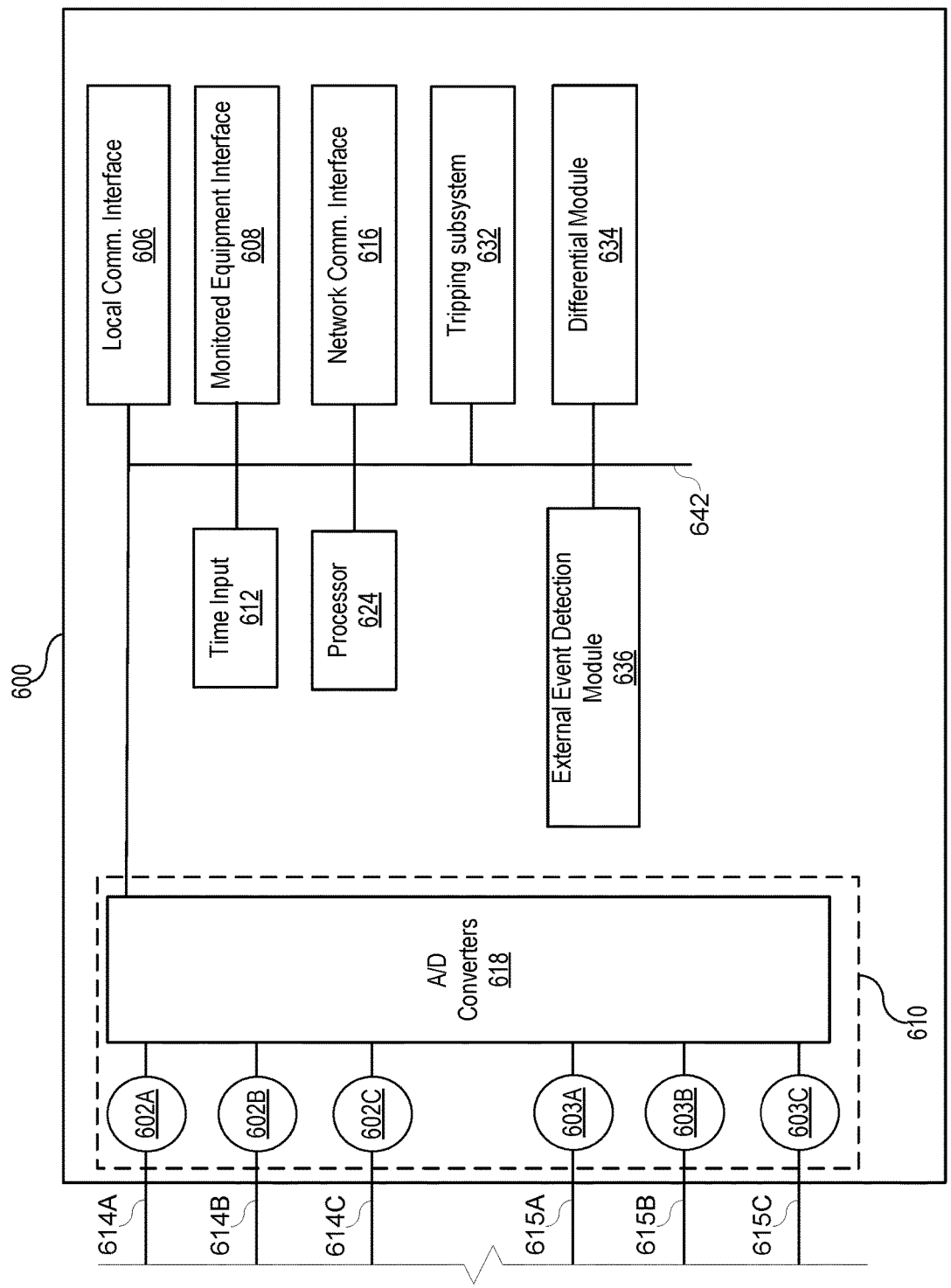
FIG. 6 illustrates a simplified functional block diagram of an intelligent electronic device (IED) in accordance with several embodiments described herein.

FIG. 6 illustrates a functional block diagram of an IED 600 that may be used in the present embodiments. IED 600 may be configured to perform a variety of tasks using a configurable combination of hardware, software, firmware, and/or any combination thereof. FIG. 6 illustrates an embodiment that includes hardware and software, various embodiments of the present disclosure may be implemented in an embedded system, field programmable gate array implementations, and specifically designed integrated circuit. In some embodiments, functions described in connection with various modules may be implemented in various types of hardware. Moreover, certain components or functions described herein may be associated with other devices or performed by other devices. The specifically illustrated configuration is merely representative of one embodiment consistent with the present disclosure.

IED 600 may include a network communications interface 616 configured to communicate with other IEDs and/or system devices. In certain embodiments, the network communications interface 616 may facilitate direct communication with another IED or communicate with another IED over a communications network. The network communications interface 616 may facilitate communications with multiple IEDs. IED 600 may further include a time input 612, which may be used to receive a time signal allowing IED 600 to apply a time-stamp to the acquired samples. In certain embodiments, a common time reference may be received via communications interface 616, and accordingly, a separate time input may not be required for time-stamping and/or synchronization operations. One such embodiment may employ the IEEE 1588 protocol. A monitored equipment interface 608 may be configured to receive status information from, and issue control instructions to, a piece of monitored equipment such as, for example, a generator, transformer, and/or circuit breakers as illustrated in FIG. 1. In some embodiments, the monitored equipment may be a shunt reactor, and IED 600 may be configured to monitor and apply protective operations to the shunt reactor.

A local communication interface 606 may also be provided for local communication with IED 600. The local communication interface 606 may be embodied in a variety of ways, including as a serial port, a parallel port, a Universal Serial Bus (USB) port, an IEEE 1394 Port, and the like.

In certain embodiments, IED 600 may include a sensor component 610. In the illustrated embodiment, sensor component 610 is configured to receive signals 614A, 614B, 614C, 615A, 615B, 615C from a plurality of instrument transformers or other equipment configured to provide signals to the IED. The sensor component 610 may use, for example, A/D converters 618 that may sample and/or digitize filtered waveforms to form corresponding digitized signals provided to data bus 642. Signals 614A-C and 615A-C may be the high side and low side (terminal side and ground side) signals from CTs such as CTs 106A-C and 108A-C of FIG. 1. In some embodiments transformers (602A, 602B, 602C, 603A, 603B, 603C) may reduce the voltage or current to a level appropriate for monitoring the equipment. A/D converters 618 may include a single A/D converter or separate A/D converters for each incoming signal. A/D converters 618 may be connected to processor 624 by way of data bus 642, through which representations of electrical parameters determined by sensor elements 602A-C and 603A-C may be transmitted to processor 624. In various embodiments, the representations of electrical parameters may represent parameters, such as currents, voltages, frequencies, phases, and other parameters associated with an electric power distribution system. Sensor elements 602A-C and 603A-C may represent a variety of types of elements, such as voltage transformers, current transformers, status inputs, a breaker controller, etc. Thus, current signals from each of the phases on the high side and low side (terminal side and the ground side) of the protected equipment may be obtained by the IED 600.

Processor 624 may be configured to process communications received via communications interface 616, time input 612, monitored equipment interface 608, local communications interface 606, and/or sensor component 610. Processor 624 may operate using any number of processing rates and architectures. Processor 624 may be configured to perform various algorithms and calculations described herein. Processor 624 may be embodied as a general-purpose integrated circuit, an application specific integrated circuit, a field-programmable gate array, and/or any other suitable programmable logic device.

A time subsystem (not separately illustrated) may be configured to determine a length of time during which a characteristic is satisfied. In various embodiments, the time subsystem may receive time information from time input 612 (or an internal time signal) and use such information to determine the length of time during which the operating point persists in the operate region. In some embodiments, the time system may include an internal time keeping system (not shown) that may be used to determine whether the tripping characteristic is satisfied for a specified time delay. In some embodiments, the threshold time delay may be determined with reference to the number of cycles of the electric power generation and distribution system.

A tripping subsystem 632 may be configured to issue a trip command based upon satisfaction of the tripping characteristic and satisfaction of the length of time. In various embodiments, the tripping subsystem 632 may be in communication with a breaker, recloser, or other device that may be configured to interrupt an electrical connection between the protected equipment (shunt reactor) and an electric power delivery system.

In some embodiments, IED 600 may be configured to require detection of an internal fault condition using a differential module 634 prior to issuing a trip command. The differential module 634 may be configured in various embodiments to operate a differential element configured to declare an internal fault condition based on operate currents $I_{OP}$ and restraint currents $I_{RT}$ calculated from the current signals provided by the sensor component 610, as well as pickup thresholds that may be entered using, for example, the local communication interface 606 or a human-machine interface (HMI) at setting time. More specifically, the differential module 634 may be configured to detect an internal fault using the methods described herein by comparing the operating and restraint currents, and comparing a resulting operating point with an operating characteristic.

As discussed above, spurious signals from CTs may result in unintended operations. To overcome these issues, the differential element hereof may perform DC compensation before determining a differential event. In particular the systems and methods hereof may compute the DC content of the current signals on each side of the protected equipment. The differential DC content (DIFFDC) may be calculated as a difference between the DC content on either side of the protected equipment. The differential DC content may be scaled by the same tap factor as the operate and restraint currents. To ensure adequate polarity, the differential DC content must be zero when both CTs (on either side of the protected equipment) reproduce the primary currents adequately.

The operate $I_{OP}$ and restraint $I_{RT}$ currents are calculated from the currents on either side of the protected equipment as described in Equations 1 and 2.

Instead of using the operate current $I_{OP}$ in the differential characteristic, several embodiments presented herein use a DC compensated operate current IOPDCcomp. The IOPDCcomp is a signal that compensates for spurious signals from the CTs, in particular when the CTs on either side of the protected equipment react differently from each other. The IOPDCcomp may be calculated by subtracting the differential DC from the operate current and taking the absolute value of the difference, as shown in Equation 4:

$$\text{IOPDCcomp} = |I_{OP} - \text{DIFFDC}| \qquad \text{Eq. 4}$$

In accordance with several embodiments, the IOPDCcomp (instead of the $I_{OP}$) is used as the operating signal in the differential characteristic unless a control signal indicates that the $I_{OP}$ current should be used. The control signal to switch between IOPDCcomp and $I_{OP}$ may be provided by a user, by another protective device or supervisory system, or internally upon occurrence of a predetermined condition. In accordance with various embodiments, the determination to use IOPDCcomp or $I_{OP}$ as the operating signal in the differential characteristic may be made by determining an average DC content of the currents from either side of the protected equipment. The average DC content ($DC_{AVE}$) may be calculated as the average of the absolute values of the DC content on either side of the protected equipment. To ensure adequate polarity, this average must be equal to the DC content on both sides of the protected equipment when both CTs (on either side of the protected equipment) reproduce the primary currents adequately.

In accordance with several embodiments, if the average DC content $DC_{AVE}$ remains above a DC content threshold for longer than a time threshold, then the new IOPDCcomp is used with the restraint current $I_{RT}$ in the differential element. Otherwise, the Equation 1 operate current $I_{OP}$ is used in the differential element. In various embodiments, when IOPDCcomp is used in the differential element, it may be used only for a predetermined time, and the Equation 1 operate current $I_{OP}$ is used in the differential element. In various embodiments, when IOPDCcomp is used in the differential element, it may be used only until the average DC content drops below the threshold for a predetermined time, and then the Equation 1 operate current $I_{OP}$ is used in the differential element.

Figure 7A:
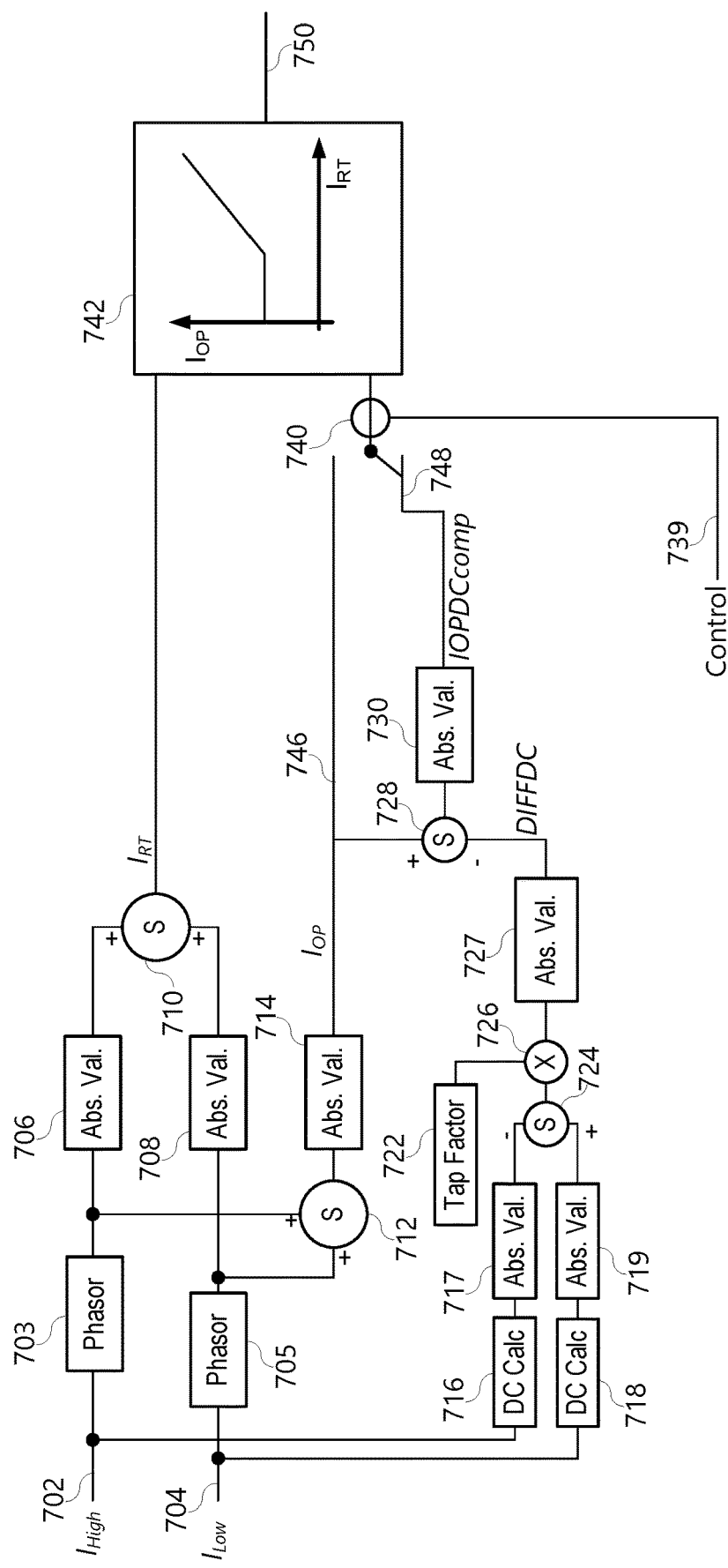
FIG. 7A illustrates a logic diagram of differential protection using a compensated operating signal in accordance with several embodiments herein.

FIG. 7A illustrates a logic diagram of a differential element in accordance with several embodiments herein, where the DC compensated operate current IOPDCcomp is used as the operating signal to the differential characteristic. Currents from each side of the protected equipment, such as high-side or terminal-side current $I_{High}$ 702 and low-side (or terminal-side or ground-side) current $I_{Low}$ 704 are obtained. In various embodiments where the protected equipment is a shunt reactor, the low-side current $I_{Low}$ 704 may be the current from the ground side of the shunt reactor. For calculation of the operate current $I_{OP}$ 746 and the restraint current $I_{RT}$, phasors of the high-side current $I_{High}$ 702 and the low-side current $I_{Low}$ 704 may be calculated using phasor calculators 703 and 705. The operate current $I_{OP}$ 746 is calculated as the absolute value 714 of the sum 712 of the phasors of the high-side current $I_{High}$ 702 and the low-side current $I_{Low}$ 704. The restraint current $I_{RT}$ is calculated as a sum 710 of the absolute value 706 of the phasor of the high-side current $I_{High}$ 702 and the absolute value 708 of the phasor of the low-side current $I_{Low}$ 704.

As discussed above, the DC compensated operating current IOPDCcomp is calculated. The absolute value 717 of the DC content of the high-side current $I_{High}$ 702 is calculated 716 and the absolute value 719 of the DC content of the low-side current $I_{Low}$ 704 is calculated 718. The DC difference DIFFDC is calculated as an absolute value 727 of a difference 724 between the high-side and low-side DC components multiplied 726 by a tap factor 722. The IOPDCcomp 748 is calculated as the absolute value 730 of the difference 728 between the scaled DIFFDC and the operate current $I_{OP}$ 746.

To determine a differential fault condition, the differential characteristic 742 uses the restraint current $I_{RT}$ and an operating signal. The operating signal can be either the operate current $I_{OP}$ 746 or the compensated operating signal IOPDCcomp 748. As described above, the fault condition may be determined in accordance with Equation 3 where the operating signal used is either $I_{OP}$ 746 or IOPDCcomp 748. In one embodiment, the system uses the IOPDCcomp signal 748 as the operating signal in the differential characteristic unless a control signal 739 is asserted to switch 740 to using the operate current $I_{OP}$ 746. In other embodiments, the system may use the operate current $I_{OP}$ 746 in the differential characteristic unless a control signal 739 is asserted to switch 740 to using the IOPDCcomp signal 748. In certain embodiments, the control signal 739 may be received from a user, a supervisory system, or other external source. In other embodiments the control signal 739 may be asserted internally upon detection of a predetermined condition. In various embodiments, the control signal 739 may be asserted based on settings of the IED.

Figure 7B:
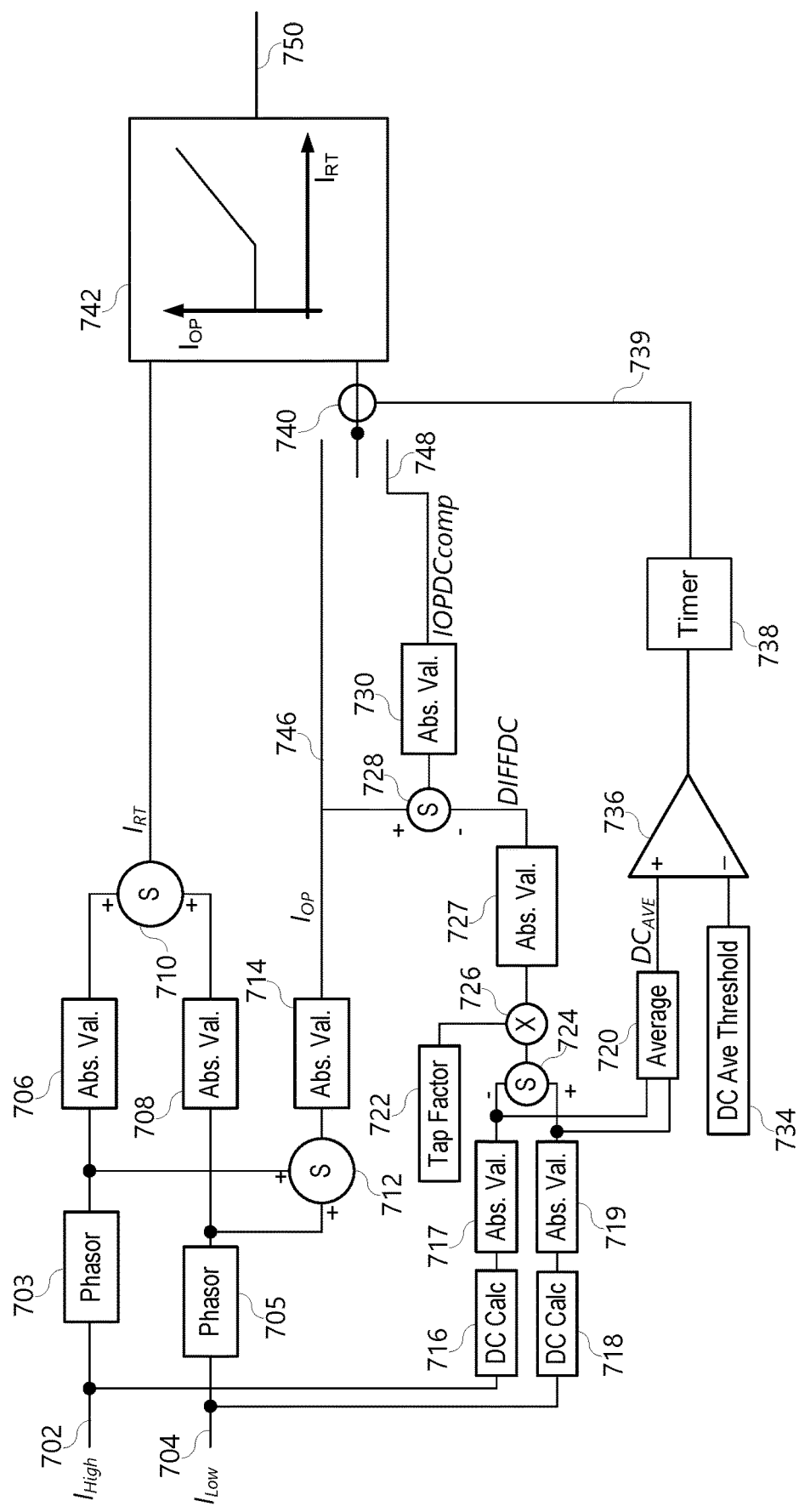
FIG. 7B illustrates a logic diagram of differential protection optionally using a compensated operating signal in accordance with several embodiments herein.

FIG. 7B illustrates a logic diagram of a differential element in accordance with several embodiments herein, where the operating signal is selected based on an average DC content, $DC_{AVE}$. The average between the absolute values 717, 719 of the DC content of the high-side current $I_{High}$ 702 and the low-side current $I_{Low}$ 704 is calculated in 720 to produce the average DC content $DC_{AVE}$. The average DC content $DC_{AVE}$ is then compared 736 with a predetermined DC average threshold 734. The DC average threshold 734 may be a factor of tap. When the absolute value of $DC_{AVE}$ exceeds the threshold 734, then timer 738 is signaled. If the absolute value of $DC_{AVE}$ exceeds the threshold 734 for a predetermined time (e.g. 0.005 seconds), then timer asserts a control signal 739 to switch 740 to use IOPDCcomp 748 as the operate current input to the differential characteristic 742. Otherwise, the switch 740 selects the operate current $I_{OP}$ 746 as the operating signal input to the differential characteristic 742. In various embodiments, after the absolute value of $DC_{AVE}$ drops below the threshold 734 for another predetermined time (e.g. 0.5 seconds), then the timer signals switch 740 to transition from using the compensated operating signal IOPDCcomp 748 in place of the operate current input to the differential characteristic 742 to using the operate current $I_{OP}$ 746 along with the restraint current $I_{RT}$ in the differential characteristic 742.

In various embodiments, the IOPDCcomp 748 is used as the operating signal in the differential characteristic 742 unless the $DC_{AVE}$ falls below a predetermined threshold 734. Then (or after a predetermined time 738) the operate current $I_{OP}$ 746 may be used as the operating signal in the differential characteristic 742.

Accordingly, several embodiments of the systems and methods described herein may calculate and use a DC compensated operating signal to determine a differential fault. In various embodiments, the DC compensated operating signal may be used unless a control signal is asserted to use the operate current as the operating signal. In various embodiments, the operate current is used unless the average DC content exceeds a threshold, when the DC compensated operating signal is used in place of the operate current as the operating signal in the differential characteristic. Put another way, when the average DC content is too high, various embodiments of the systems and methods herein calculate a compensated operating signal for use in determining a differential fault condition. The average DC content may be calculated from absolute values of DC current content on either side of the protected equipment.

As has been described above, upon determining a differential fault condition, the systems and methods herein may then effect a protective action by, for example, signaling a breaker to trip. Thus, electric power is removed from the protected equipment. In various embodiments, the fault condition must be detected for a predetermined time before the protective action is signal is taken.

It should be noted that the logic diagram of FIGS. 7A and 7B illustrate methods of providing differential protection to protected equipment of an electric power delivery system. Indeed, the methods may include the general steps of: calculating the operate current from the high-side current signal 702 and the low-side current signal 704; calculate the restraint current from the high-side current signal 702 and the low-side current signal 704; calculate a compensated operating signal from the operate current and the high-side current signal 702 and the low-side current signal 704; calculate an average direct current content of the high-side current signal 702 and the low-side current signal 704; determine a differential fault condition of the electrical equipment using the compensated operating signal; and assert a trip signal upon determination of the differential fault condition. In various embodiments, the method may switch between using the compensated operating signal and the operate current as the operating signal in the differential characteristic using a control signal. The control signal may be provided externally or calculated using an average direct current content of the high-side current signal 702 and the low-side current signal 704.

Figure 8A:
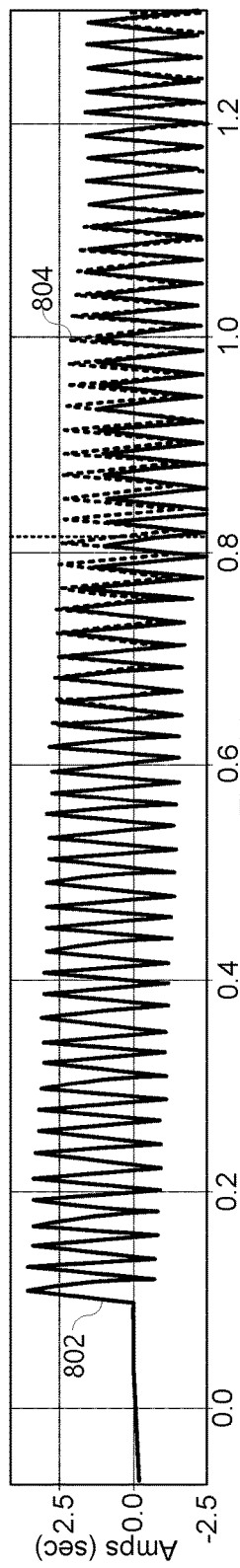
FIGS. 8A, 8B, and 8C illustrate current signals for an event on protected equipment of the electric power delivery system.
Figure 8B:
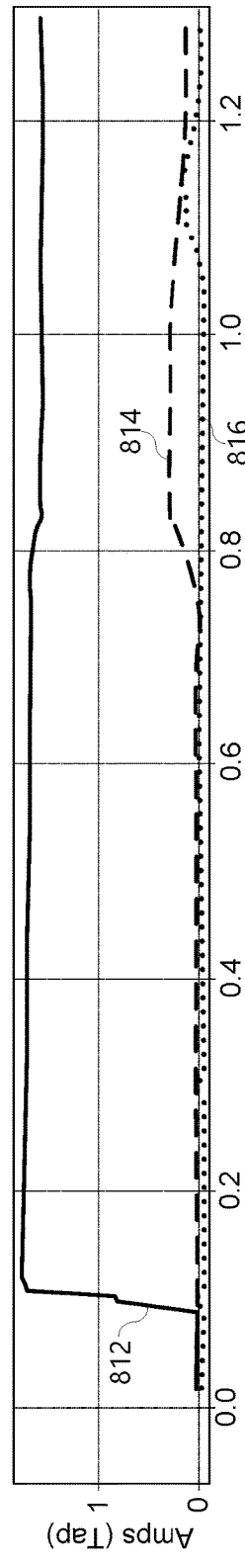
Figure 8C:
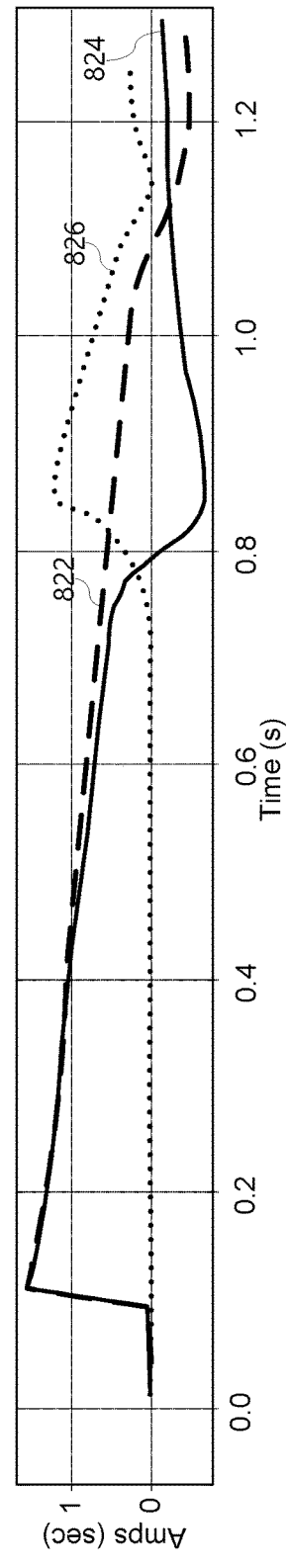

FIGS. 8A, 8B, and 8C illustrate currents and outputs of a differential element of one example in accordance with several embodiments herein. The illustrated example includes terminal (high-side) current signals 804 and ground-side (low-side) current signals 802 obtained by an IED protecting a shunt reactor during energization of the shunt reactor. From those current signals, the operate current $I_{OP}$ 814, restraint current $I_{RT}$ 812, and the compensated operating signal IOPDCcomp 816 are calculated and displayed in FIG. 8B. The DC components and DC differential signal are also calculated as described above. FIG. 8C illustrates the high-side DC content 822, the low-side DC content 824 and the differential DC current DIFFDC 826. It can be seen that as the high-side and low-side currents separate starting at around time 0.7, the operate current $I_{OP}$ 814 increases, but the compensated operating signal IOPDCcomp 816 remains low until around time 1.1.

Figure 9:
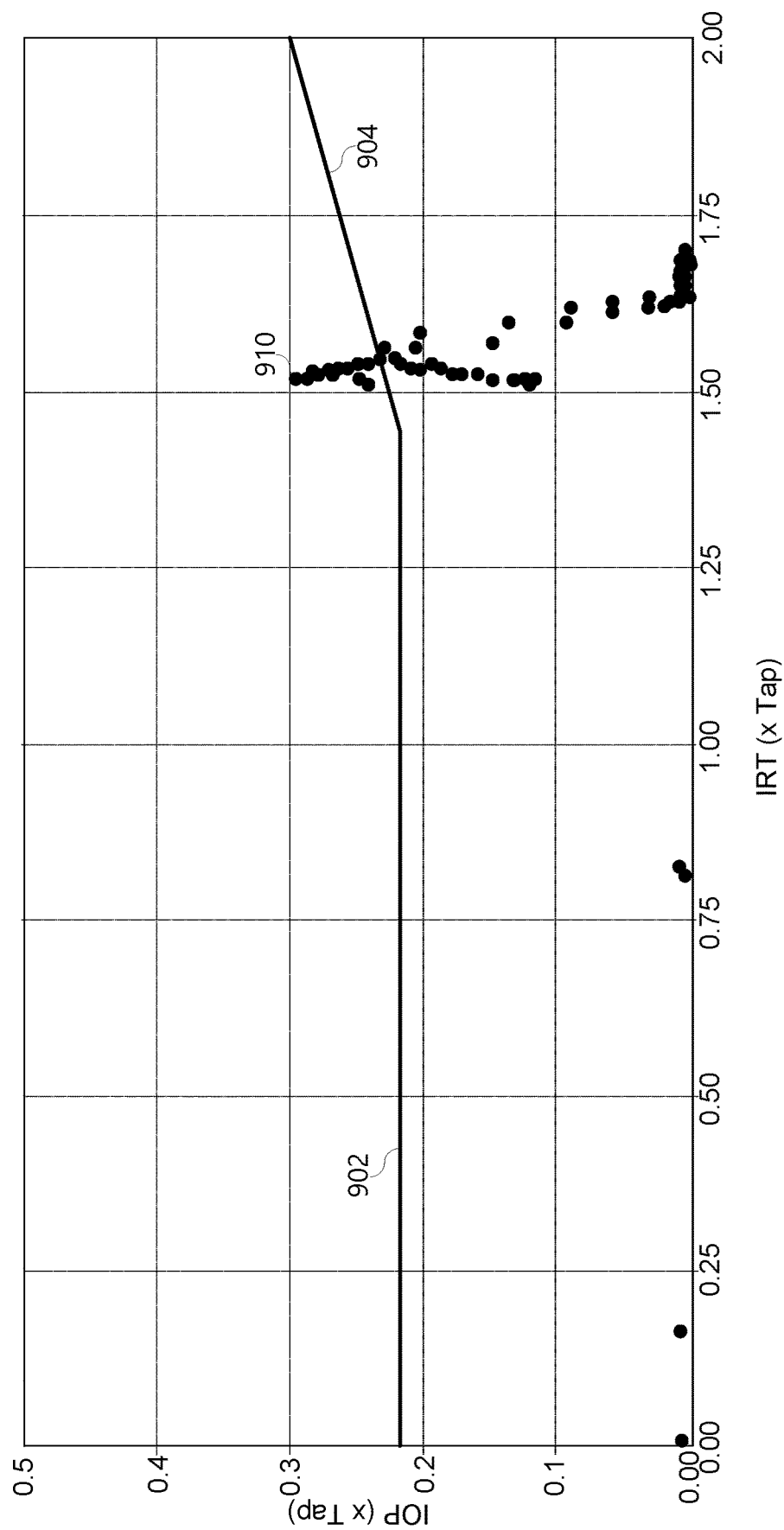
FIG. 9 illustrates a diagram of the differential element operating characteristic with the operate current.

FIG. 9 illustrates various operating points 910 on a differential characteristic, where the operating points 910 use the traditional operate current $I_{OP}$ 814 illustrated in FIG. 8B. It can be seen that the operating points 910 exceed both the predetermined operate threshold 902 (e.g. DPU from Equation 3) and the slope function of the restraint current $I_{RT}$ 904 (e.g. SLP*$I_{RT}$ from Equation 3). Accordingly, an output of a differential element using the traditional operate current and the differential characteristic would output a differential fault signal, which may result in an unintended operation.

Figure 10:
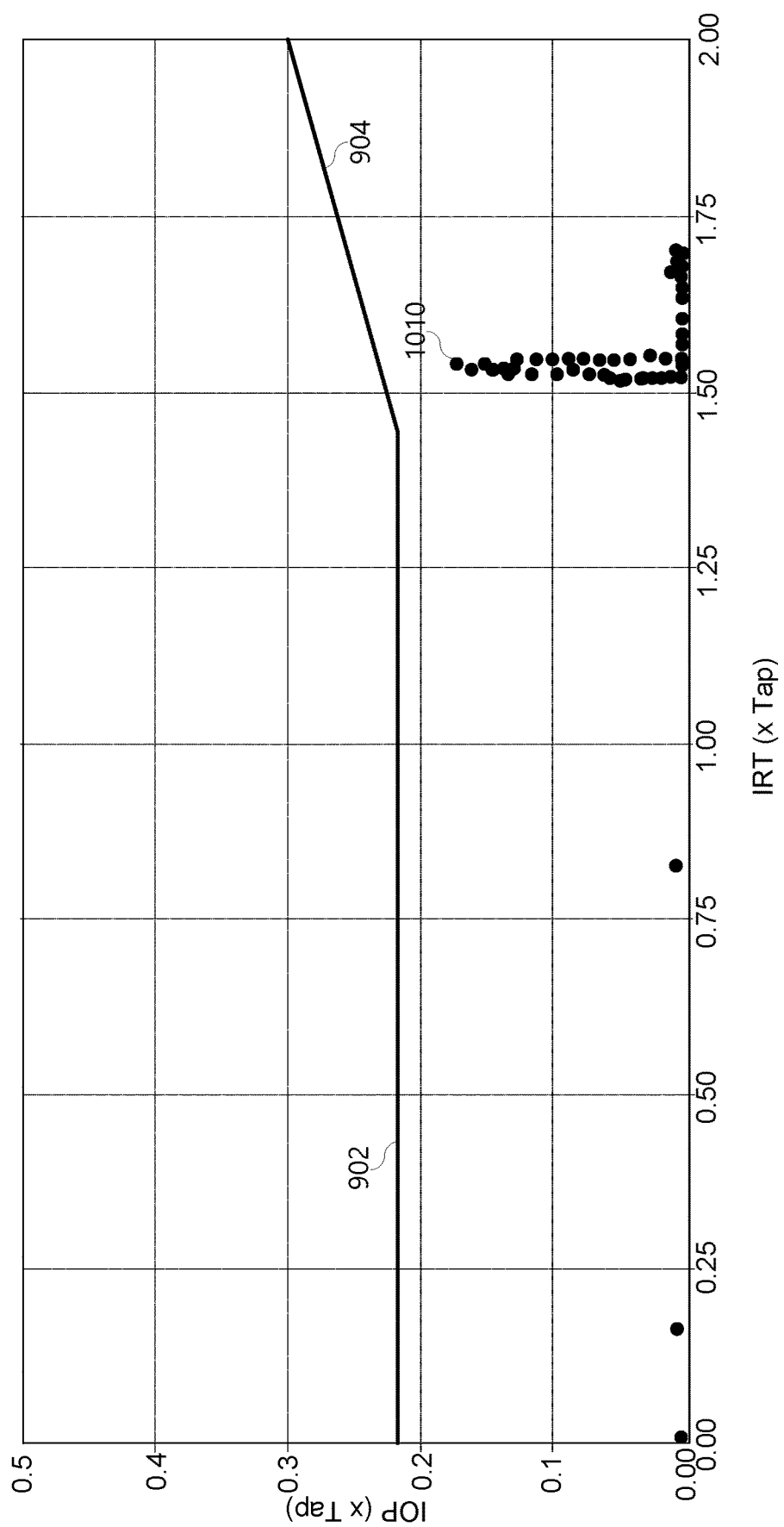
FIG. 10 illustrates a diagram of the differential element operating characteristic using a compensated operating signal in accordance with several embodiments herein.

FIG. 10 illustrates various operating points 1010 on a differential characteristic, where the operating points 1010 use the compensated operating signal IOPDCcomp 816 of the present disclosure. It should be noted that the operating points do not cross into the operate region. Accordingly, a differential fault signal is not made, and no unintended operation due to a spurious differential fault signal would be taken. Thus, the methods and systems described herein can be seen to reduce unintended operations even when the CTs on either side of the protected equipment may provide spurious current signals.

The above description provides numerous specific details for a thorough understanding of the embodiments described herein. However, those of skill in the art will recognize that one or more of the specific details may be omitted, or other methods, components, or materials may be used. In some cases, operations are not shown or described in detail. While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A system for differential protection of electrical equipment of an electric power delivery system, comprising:
    a sensor component to receive current signals from a first end of the electrical equipment and current signals from a second end of the electrical equipment;
    a differential protection element in communication with the sensor component configured to:
        calculate an operate current from the current signals from the first end and the current signals from the second end;
        calculate a restraint current from the current signals from the first end and the current signals from the second end;
        calculate a compensated operating signal from the operate current, the current signals from the first end, and the current signals from the second end;
        determine a differential fault condition of the electrical equipment using the restraint current and the compensated operating signal; and,
        assert a fault signal upon determination of the differential fault condition; and
    a tripping subsystem in communication with the differential protection element configured to effect a protective action of the electrical equipment upon assertion of the fault signal from the differential protection element.

2. The system of claim 1, wherein the differential protection element is further configured to:
    calculate an average direct current (DC) content of the current signals from the first end and the current signals from the second end;
    compare the average DC content to a threshold; and
    switch between using the operate current and the compensated operating signal in determination of the differential fault condition based on the comparison of the average DC content and the threshold.

3. The system of claim 2, wherein the differential protection element determines a differential fault condition using the compensated operating signal when the average DC content exceeds the threshold for a predetermined time.

4. The system of claim 1, wherein the compensated operating signal comprises a difference between the operate current and a differential DC current.

5. The system of claim 4, wherein the compensated operating signal comprises an absolute value of the difference.

6. The system of claim 4, wherein the differential DC current comprises a difference between DC content of the current signal from the first end and the DC content of the current signal from the second end.

7. The system of claim 6, wherein the differential DC current comprises an absolute value of the difference.

8. The system of claim 1, wherein the current signal from the first end comprises a current signal from a terminal side of the protected equipment, and the current signal from the second end comprises a current signal from a neutral side of the protected equipment.

9. The system of claim 8, wherein the protected equipment comprises a shunt reactor.

10. The system of claim 1, wherein the current signals from the first end are obtained using a first current transformer (CT) and the current signals from the second end are obtained using a second CT.

11. The system of claim 10, wherein the first CT and second CT exhibit different responses to a current signal.

12. The system of claim 11, wherein the first CT and second CT exhibit different responses to inrush current.

13. The system of claim 1, wherein the protective action comprises a trip signal.

14. The system of claim 13, wherein the tripping subsystem is configured to assert the trip signal to a circuit breaker to effect the protection action.

15. A method for differential protection of protected equipment of an electric power delivery system, comprising:
    obtaining current signals from a first end of the electrical equipment;
    obtaining current signals from a second end of the electrical equipment;

calculating an operate current from the current signals from the first end and the current signals from the second end;

calculate a restraint current from the current signals from the first end and the current signals from the second end;

calculating a compensated operating signal from the operate current, the current signals from the first end, and the current signals from the second end;

determining a differential fault condition of the electrical equipment using the restraint current and compensated operating signal; and asserting a fault signal upon determination of the differential fault condition; and effecting a protective action of the electrical equipment upon assertion of the fault signal.

16. The method of claim 15, further comprising:

calculating an average direct current (DC) content of the current signals from the first end and the current signals from the second end;

comparing the average DC content to a threshold; and switching between using the operate current and the compensated operating signal in determining the differential fault condition based on the comparison of the average DC content and the threshold.

17. The method of claim 16, wherein the compensated operating signal comprises a difference between the operate current and a differential DC current.

18. The method of claim 17, wherein the compensated operating signal comprises an absolute value of the difference.

19. The method of claim 17, wherein the differential DC current comprises a difference between DC content of the current signal from the first end and the DC content of the current signal from the second end.

20. The method 15, wherein the protected equipment comprises a shunt reactor.

* * * * *